United States Patent [19]
Berkers et al.

[11] Patent Number: 5,715,508
[45] Date of Patent: Feb. 3, 1998

[54] APPARATUS FOR PRINTING RECORDING MEDIA OR SUPPORTS IN THE FORM OF DISCS

[75] Inventors: Jacobus A. P. Berkers, Koningslust; Mathieu J. M. Hendriks, Haelen; Marius C. Koning, Klimmen, all of Netherlands

[73] Assignee: Oce-Nederland, B.V., Ma Venlo, Netherlands

[21] Appl. No.: 601,854

[22] Filed: Feb. 15, 1996

[30] Foreign Application Priority Data

Feb. 15, 1995 [NL] Netherlands .......................... 9500279

[51] Int. Cl.$^6$ ............................................. G03G 15/14
[52] U.S. Cl. ....................... 399/308; 399/328; 156/240
[58] Field of Search ..................... 355/202, 273, 355/279, 275, 285; 346/137; 369/275.1; 156/240, 583.5; 399/69, 328, 335, 341, 400, 308

[56] References Cited

FOREIGN PATENT DOCUMENTS

| | | |
|---|---|---|
| 0361562 | 4/1990 | European Pat. Off. . |
| 0581378 | 2/1994 | European Pat. Off. . |
| 2660474 | 10/1991 | France . |

OTHER PUBLICATIONS

Derwent Publications Ltd., London, GB; Class G08, AN 93–221569 JP A 05 142 967.

Patent Abstracts of Japan, vol. 013, No. 098 (P–840) Mar. 8, 1989, JP A 63–279267.

Patent Abstract of Japan, vol. 013, No. 368 (P–919) Aug. 16, 1989, JP A 01–124130.

*Primary Examiner*—Nestor R. Ramirez
*Attorney, Agent, or Firm*—Birch, Stewart, Kolasch & Birch, LLP

[57] ABSTRACT

An apparatus for printing recording media or supports in the form of discs, wherein a fusible powder is applied imagewise to an image-forming medium and then transferred to an intermediate medium, the powder image on the intermediate medium then being brought into contact, in a contact zone, with a recording disc, the latter being heated in a preheater before the contact zone to a temperature of at least 60° C., and wherein the intermediate medium in the contact zone is heated to a temperature of at least 100° C.

4 Claims, 2 Drawing Sheets

5,715,508

APPARATUS FOR PRINTING RECORDING MEDIA OR SUPPORTS IN THE FORM OF DISCS

FIELD AND BACKGROUND OF THE INVENTION

The invention relates to apparatus for printing recording media or supports in the form of discs, such media or supports hereinafter being referred to simply as "recording discs" and denoting sound and/or image supports, e.g. compact discs, and also supports which require subsequent processing for the application of audio or video data. Recording media of this kind are processed in an apparatus in which the recording discs are moved from one processing station to another and are provided with an impression in one of the processing stations. In conventional processing stations for printing recording discs, use is made, for example, of a screen printer or a pad printer. For this purpose, a screen must be made for each series of recording discs in order to print the same therewith. In the case of color printing, at least four such screens are required.

Such production of the required screens is very complex and expensive and prevents rapid change of discs with different impressions. For each new image the processing machines must be stopped to replace the screens and the process then run again. The object of the present invention is accordingly to obviate these disadvantages.

SUMMARY OF THE INVENTION

According to the invention, use is made of an apparatus for printing CDs wherein a fusible powder is applied imagewise to an image-forming medium and then transferred to an intermediate medium, the powder image on the intermediate medium then being brought into contact, in a contact zone, with the CD, the latter being heated in a preheater before the contact zone to a temperature of at least 60° C., and wherein the intermediate medium in the contact zone is heated to a temperature of at least 100° C.

The effect of this is that different images can be applied to the image-forming medium in rapid succession and these images on the discs can be transferred without stopping the processing machine, thus increasing the machine productivity and permanently connecting the transferred images to the discs.

BRIEF DESCRIPTION OF THE DRAWINGS

The invention will be explained in detail hereinafter with reference to a number of drawings, from which these and other advantages will be apparent.

DETAILED DESCRIPTION OF THE INVENTION

Figure 1:
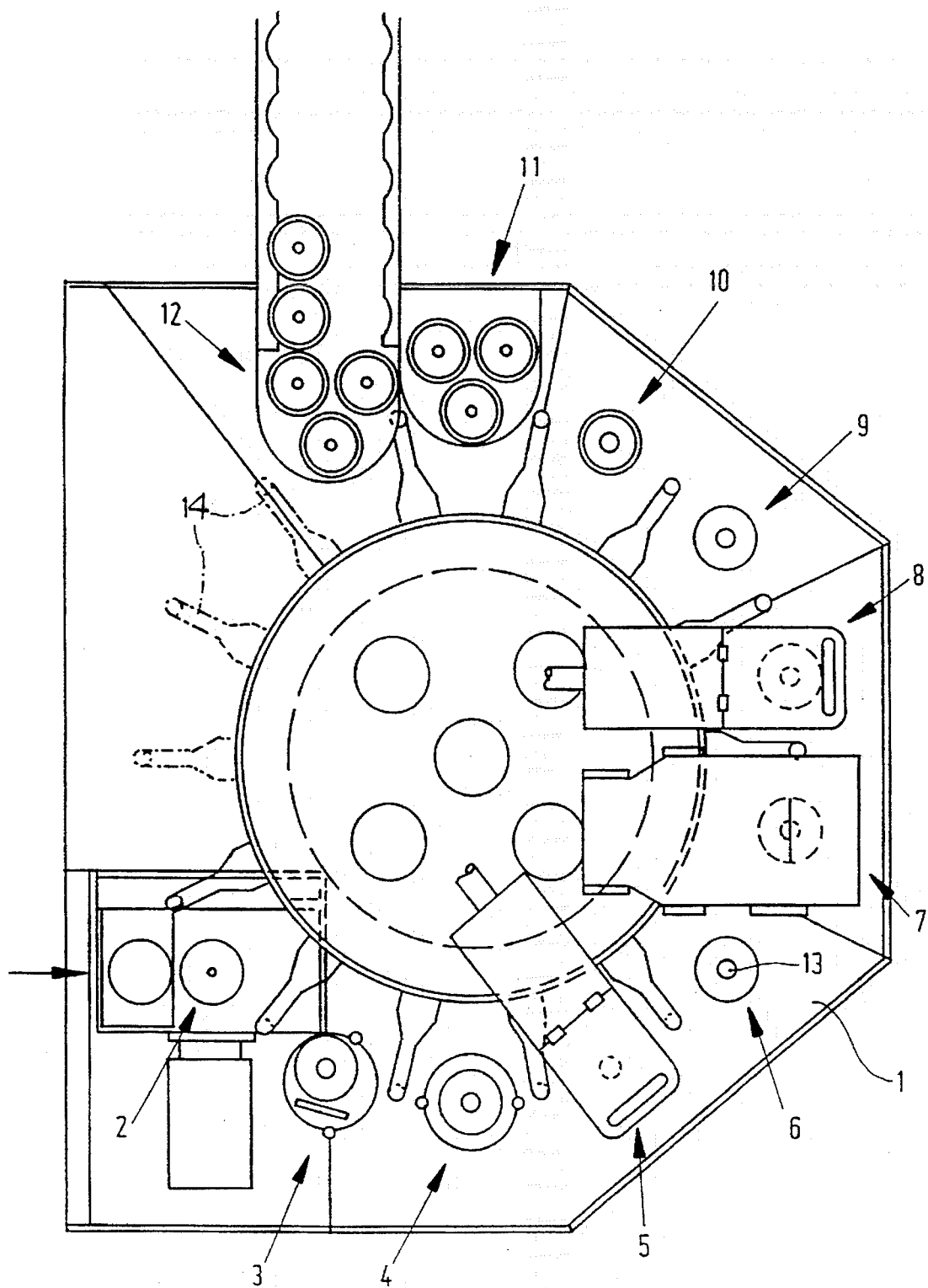
FIG. 1 is a diagram showing a known apparatus for processing recording media in disc form.

The apparatus shown in FIG. 1 comprises a frame 1 serving to support a number of stations in which recording discs, more particularly compact discs, can be manufactured, processed and/or inspected. The recording discs are formed in station 2 by means of an injection molding process. The flash and other excess material are cut away. The recording discs originating from an injection molding machine are given a metal coating in station 3. Since means known per se are used in this case, the specific construction of the means of providing this metal coating on the support in station 3 will not be described in detail.

As will be described in detail hereinafter, a quantity of varnish is applied to the top surface of the support in station 4 whereupon the support with the varnish applied thereto is rapidly rotated to spread the varnish uniformly over the surface of the support.

A device for curing and/or drying the varnish is provided in station 5.

In the embodiment illustrated, known means for processing the support are provided in station 6. However, both in this station and in the various other stations a preferably easily exchangeable processing unit can be provided, e.g. to give the support a layer of basic color.

Station 7 contains an exchangeable processing unit in the form of a printing device for applying an impression to the support. This may be a screen printing device or a pad printing device. An extracting means can also be provided in station 7 to feed the consecutive supports if required to a printing device at a distance from station 7 and return supports printed therein to station 7. Given correct adjustment, it is possible to ensure that an unprinted support is removed at station 7 and a printed support introduced during the machine cycle time, a number of supports being present at the printing device if required.

In order to carry out multi-color printing it is also possible to provide various stations with printing devices using different colors, possibly with intermediate drying and/or hardening devices.

Station 8 contains a processing unit for drying and/or the hardening of the applied impression. The drying device can, for example, correspond to the drying device in station 5.

In the embodiment illustrated, station 9 contains known means for processing the support, although of course here again any desired processing unit can be provided.

Station 10 contains a sensing device for checking the recording disc.

Station 11 is provided with means known per se for discharging rejected supports.

Station 12 is provided with means known per se for discharging approved supports.

Each of the stations is provided with a support means 13 illustrated diagrammatically in FIG. 1, on which a recording disc can be placed for processing and/or checking in the associated station. The support means 13 may have a different form of construction for each station and be formed, for example, by a gripper which grips the outer periphery of the support either in the opening in the support or by means of a suction cup. As will be apparent from FIG. 1, these support means are situated on an arc of a circle so that the angular distance between two consecutive support means 13 is always the same.

To transfer the sound and/or video disc between consecutive stations 2–12 it is possible to use a conveyor means comprising annular means 14 as described, for example, in Netherlands Application No. 9201065. The term recording support or medium in disc form, or recording disc, as used in this application denotes a compact disc, a laser disc, a video disc, CD-ROM or the like.

Figure 2:
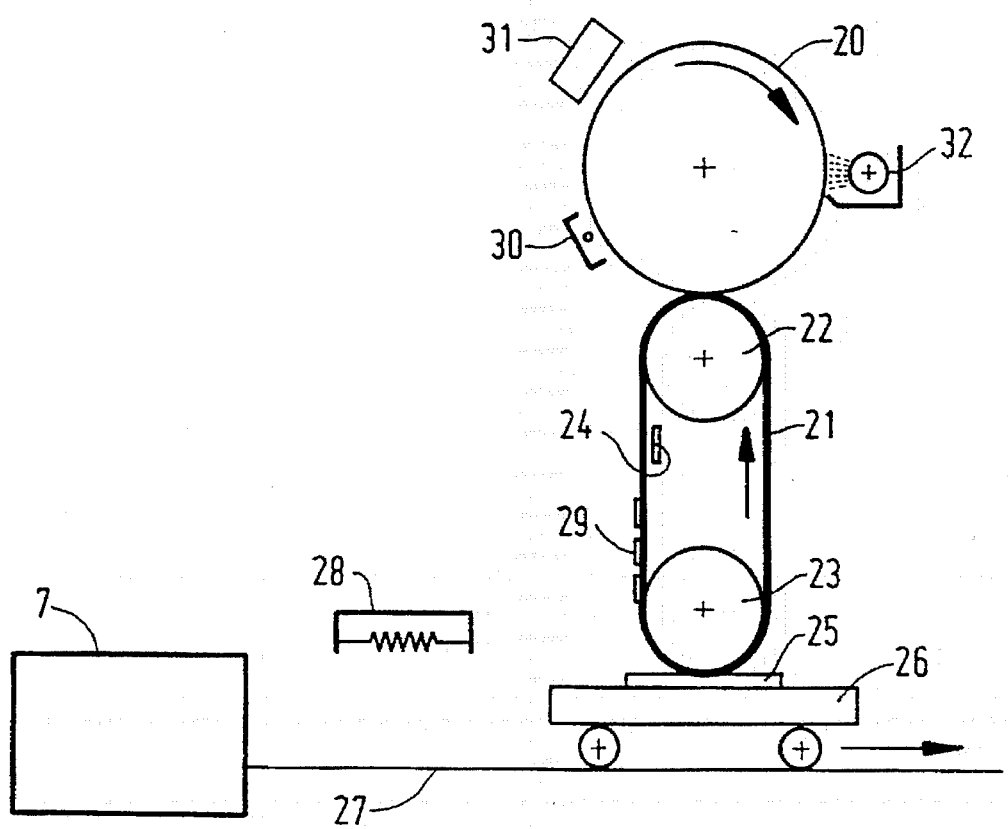
FIG. 2 is a diagram showing an apparatus according to the invention.

FIG. 2 diagrammatically illustrates an apparatus according to the invention. A rotatably mounted image-forming medium 20 provided with an electrophotographic layer is provided with a uniform charge in charging station 30, and this charge is exposed image-wise, for example by means of a laser, in exposure station 31. The remaining charge image is provided with a fusible powder in developing station 32. This powder image 29 is transferred to an intermediate medium 21 by contact therewith. Intermediate medium 21 is formed by a flexible belt provided with a top coating of silicone rubber and supported by transport rollers 22 and 23. The intermediate medium 21 with the powder image 29 thereon is so heated by a heating means 24 that the powder on the medium is in the molten state at the conveyor roller 23. In station 7 (FIG. 1) there is an extractor which transfers the discs to a holder 26. The holder 26 is provided with transport means which brings the discs via a conveyor 27 into contact with the powder image 29 on the intermediate medium 21. The temperature of the intermediate medium 21 in the contact zone is at least 100° C. and is at a maximum 140° C. Before contact, the disc is heated in a preheater 28 to a temperature of at least 60° C. and not more than 100° C.

In the contact zone, the melted powder image 29 is transferred to the recording discs. After the toner image has been completely transferred the recording disc is transported back to station 7 via the conveyor 27, so that the printed disc can follow its path via the other stations 8 to 12.

The apparatus is provided with synchronization means (not shown) to ensure that the powder image recorded and developed on the image-forming medium 20 is formed in register with the disc moving past in the contact zone.

It will be apparent that when forming a powder image on the image-forming medium 20 it is also possible to use other image-forming techniques. A suitable technique, for example, is an inductographic technique, such as described in European patent 0 191 521. In this method, the drum on which the image-forming medium 20 is situated is replaced by a drum provided with a series of electrodes which are isolated from one another and which extend along the periphery of the drum and which can be energized in a voltage image-wise manner by means of triggering electrodes, it then being possible to provide them with an image-wise powder image by means of a suitable developing station 32.

Figure 3:
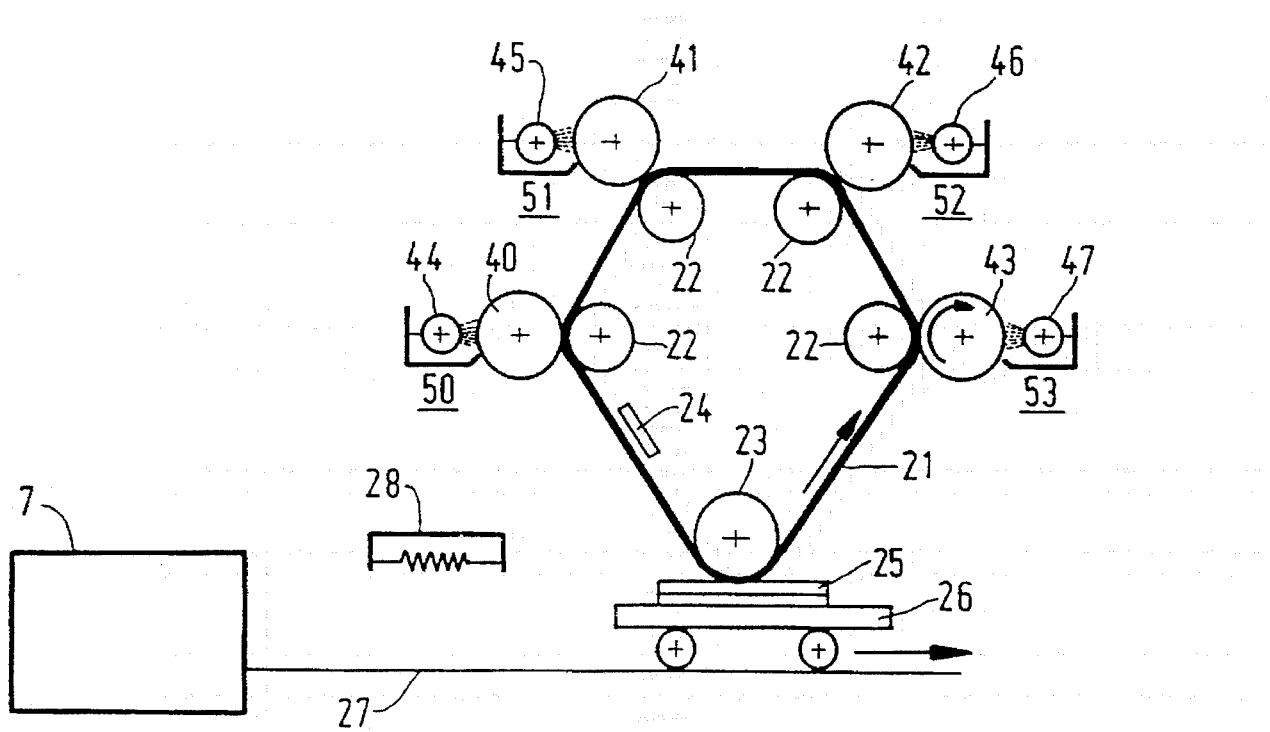
FIG. 3 is a diagram showing an apparatus according to the invention for the color printing of recording media in disc form.

FIG. 3 is a diagram showing an apparatus according to the invention for printing recording discs in color by the inductographic principle. The reference numerals of FIG. 2 have been retained for identical functions or components. Four image-forming media 50-53 are shown around the intermediate medium 21 in web form, each medium having an inductographic drum 40-43 and a developing device 44-47. The developing devices 44-47 are each provided with a toner in a separate color, e.g. cyan, magenta, yellow and black or red, yellow, blue and white. The drums 40-43 are provided with electrodes extending around the drums in a dielectric layer and are so triggered that the color separation images formed separately on these drums are transferred in register to the intermediate medium 21. The color image thus formed by fusible toner powder on the intermediate medium 21 is then heated again by means of heater 24 and transferred to the passing disc 25. It is apparent that any required number of image-forming devices can be provided and that they can be provided with the required color in order to form the required color image on the disc.

The image-wise triggering of the image-forming devices according to FIGS. 2 and 3 can be effected with means known per se. However, it will generally be by means of a computer or image make-up station on which an image can be made up and the data required for the image are transferred to the image-forming devices. In this way it is possible to provide a different impression for each of the discs in a rapid and simple manner.

In the examples illustrated the intermediate medium is a flexible belt provided with a top coat of silicone rubber, but it is of course possible to use a rotatable drum for the purpose and provide it with, e.g., an outer layer of silicone rubber. The image-forming devices should then be placed in accordance with this construction.

To bring the intermediate medium 21 to the required temperature in the transfer zone, the heater 24 can be mounted in a metal transport roller 23.

A recording disc is generally constructed from a polyacrylate disc provided with signal cells on one side. A reflecting layer of aluminum is vapor-coated over these signal cells and this layer is covered by a seal layer. With the apparatus described, the impression is applied directly to the seal layer and good results are obtained. Depending on the required adhesion of the toner image, however, an extra adhesive layer can be provided over the seal layer in a thickness of 1 to 20 μm and contain at least 50% by volume of polyvinyl acetate. For this purpose, for example, a spin coater is mounted on support means 13, and a solution of poll;vinyl acetate is applied in a suitable solvent to the recording disc. By rapidly rotating the recording disc the solution is applied uniformly and in the required thickness. Depending on the thickness of the applied layer extra drying may be necessary. It is also possible to carry out this drying by means of the preheater 28. The mixture applied can be provided with a UV-curing varnish, by means of which it is possible to cure this layer by a suitable UV source before the recording disc is fed to the coating station. Another possibility is to add polyvinyl acetate to the solution for the seal layer, which generally also contains a UV-curing resin, and apply this solution in station 4, thus eliminating the need for an extra coating station.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for printing recording media in the form of discs, wherein a fusible powder is applied image-wise to an image-forming medium and then transferred to an intermediate medium, wherein the powder image on the intermediate medium is then brought into contact, in a contact zone, with the recording disc, the latter being heated in a preheater before the contact zone to a temperature of at least 60° C., and wherein the intermediate medium in the contact zone is heated to a temperature of at least 100° C., and wherein a coating device is provided in a path situated in front of the preheater, and wherein said coating device provides the recording disc with a top coat.

2. The apparatus according to claim 1, wherein said top coat is an adhesive layer containing at least 50% polyvinyl acetate.

3. The apparatus according to claim 1, wherein said top coat is a mixture of polyvinyl acetate and a UV-curing varnish.

4. The apparatus according to claim 1, wherein said coating device comprises a spin coater.

* * * * *